Jan. 7, 1936.  O. HACKER  2,027,304
RUNNING GEAR FOR VEHICLES
Filed Sept. 13, 1933  4 Sheets-Sheet 1

Oskar Hacker
INVENTOR
ATTORNEY

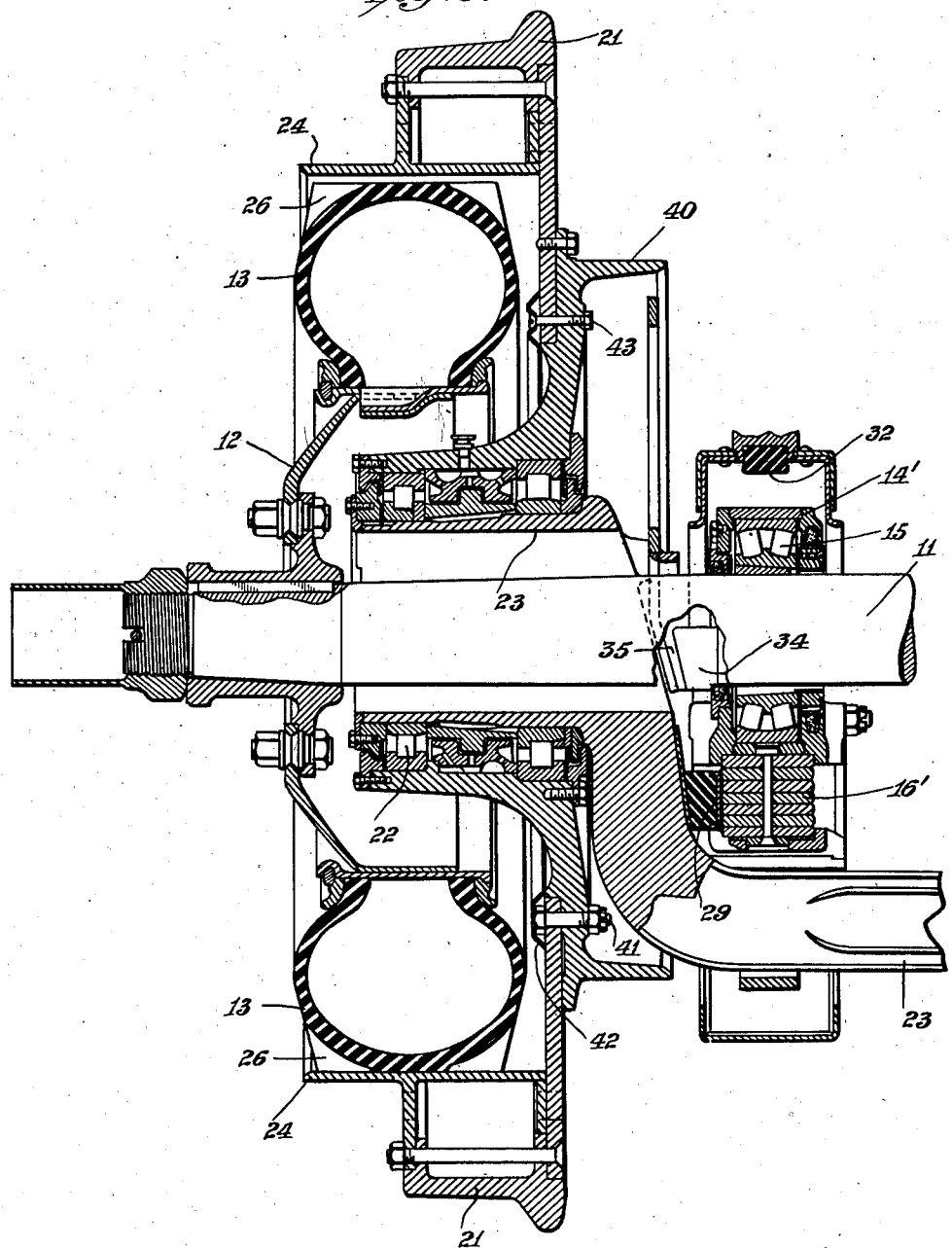

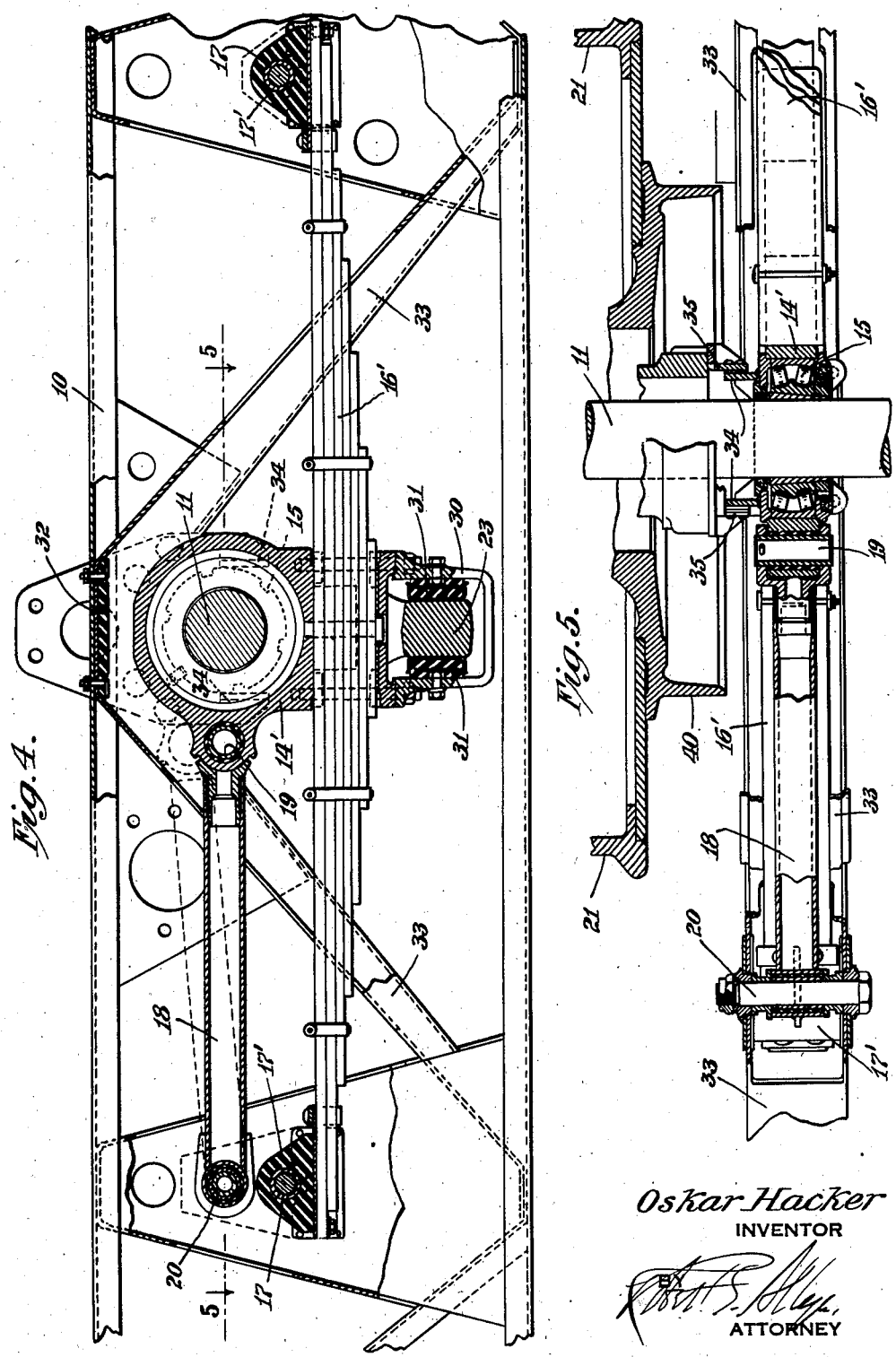

Jan. 7, 1936.   O. HACKER   2,027,304
RUNNING GEAR FOR VEHICLES
Filed Sept. 13, 1933   4 Sheets-Sheet 4

Oskar Hacker
INVENTOR
BY
ATTORNEY

Patented Jan. 7, 1936

2,027,304

UNITED STATES PATENT OFFICE 2,027,304

RUNNING GEAR FOR VEHICLES

Oskar Hacker, Wiener-Neustadt, Austria, assignor to Austro-Daimler-Puchwerke A. G., Wiener-Neustadt, Austria, a firm Application September 13, 1933, Serial No. 689,193

22 Claims. (Cl. 105—215)

My invention relates particularly to improvements adapted to vehicles which run on rails or tracks and is a partial continuation of my application 633,188, filed September 14, 1932, containing subject matter divided out of that application and also disclosing improvements in a commercial form of the apparatus.

My invention provides the advantages of pneumatic tired vehicles and in addition enables the vehicle to be guided by fixed rails or tracks. Efforts have heretofore been made to provide pneumatic tires for rail vehicles but many serious problems arise which can not be solved by vehicles in which the pneumatic tires run directly upon the rails.

Among the difficulties is the extreme vulnerability of the pneumatic tires when running directly on the rails.

Another serious difficulty arises from the limited permissible area of tractive contact.

I have sought to overcome these difficulties and to provide a construction in which the pneumatic load bearing tires are substantially enclosed within and protected by guiding or road wheels.

In the preferred form the main frame or platform of the car is supported by the load bearing axles through the medium of suitable systems of springs and the pneumatic tires are mounted on the opposite ends of such axles.

Each guiding or road wheel is designed to run on tracks and is provided with an interior drumlike surface in which a pneumatic tire is supported. This tire is preferably of slightly less diameter than the interior of the drum so that when the load is applied the pneumatic tire bears or runs on the inner wall of the drum, the pressure being distributed over a substantial part of the circumference, preferably from something like 90° to 120°. This area will, of course, vary with the design and the load but in any event I prefer that the pneumatic tire shall be free from contact at the top and partway down the sides so as to permit freedom of resiliency and reduce the wear on the pneumatic tire.

Road wheels are arranged in pairs corresponding with the associated pairs of pneumatic tires and oppositely disposed road wheels are connected by an axle which is connected with the load system in such a manner as to limit the forward and back relative movement of the road or guiding wheels with respect to the pneumatic or load bearing wheels. Normally there is no substantial load upon the axles of the guiding or track wheels but in case of the deflation of a pneumatic tire the load axle descends and the load is transmitted to the axle of the guiding or road wheels.

Fig. 3 is an enlarged sectional view showing the single wheel involving my invention with an underslung type of spring.

Fig. 4 is a detail side view showing one of the springs and the method of connection to the frame and the axles.

Fig. 5 is a section and plan on the plane of the line 5—5 of Fig. 4.

The main frame, platform or chassis 10 may be of any suitable type. Each load bearing axle 11 carries at its outer ends a wheel 12 having a pneumatic tire 13. This tire and wheel may be of any suitable construction but the parts are preferably removable so that the wheel can be removed and so that the tire itself can be removed.

Figure 1:
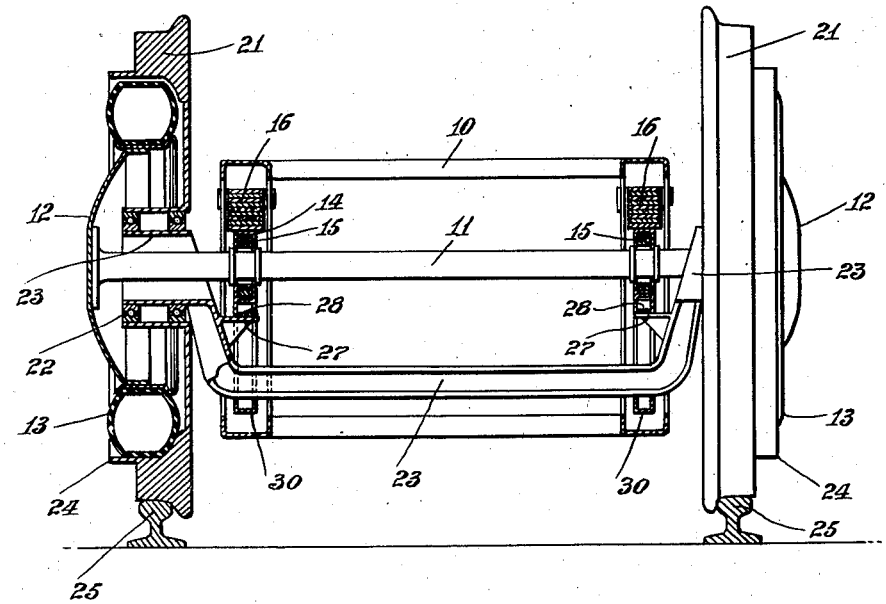
Fig. 1 is a vertical transverse sectional view showing one form of the invention as disclosed in my original application.
Figure 2:
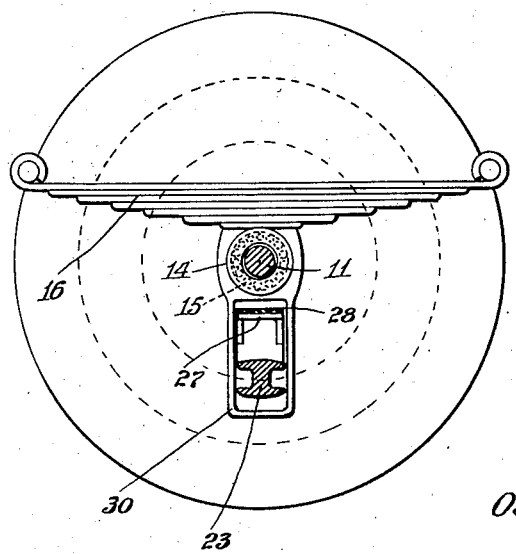
Fig. 2 is a sectional view showing parts illustrated in Fig. 1.

In the form shown in Figs. 1 and 2 a fitting 14 is mounted on the axle 11 preferably with antifriction bearings 15 interposed between the axle and the fitting. A spring 16 is interposed between the main frame 10 or platform and the fitting 14.

In the form shown in Figs. 3, 4 and 5 the spring 16' is supported at its center from the lower part of the fitting 14' and the load from the vehicle frame 10 is transmitted to the ends of the spring 16' through the bolts 17 and the resilient rubber blocks 17'. The fitting or housing 14' which is secured to the top of the spring 16' is maintained in its proper position by means of a tie or radius rod 18 which is hinged to the fitting by the pin 19 and hinged to the frame by pin 20. The tie rods 18 and the fittings 14' on the opposite sides of the machine maintain the axle 11 in its proper position in the frame and take up the acceleration and deceleration forces arising from the starting and stopping of the vehicle. In case of breakage of a spring 16' the tie rod 18 maintains the attached parts in position.

The road or track unit consists of two wheels 21 each supported on bearings 22 which are located on the outer ends of the axle 23. The ends of this axle are tubular to allow for the passage of the ends of the inner axle 11 and each wheel 21 is provided with a drum-like portion 24 which encloses the pneumatic tire of the associated load carrying wheel.

The periphery of the wheel 21 is, of course, designed to ride upon the type of track 25 for which it is designed. The drum 24, however, is made to have a much wider tread so as to increase the supporting surface.

The tire 13 is preferably provided with projections 26 around the periphery to increase the supporting surface and more uniformly distribute the pressure and at the same time facilitate the air cooling of the tire.

Figure 6:
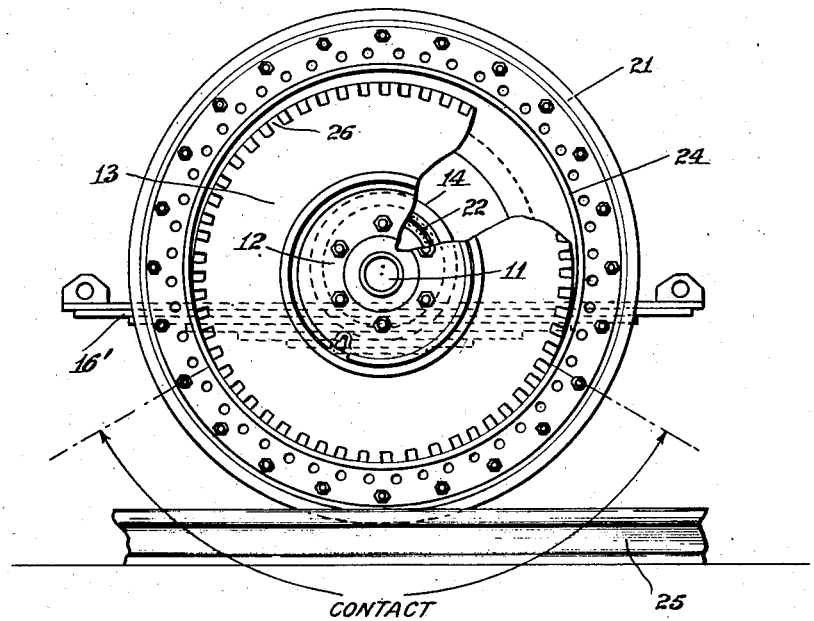
Fig. 6 is a side view showing an entire wheel and its relation to a section of track.

The pneumatic tire is preferably made only slightly smaller in diameter than the inside of the drum 24 so that when the wheels are in use the pneumatic tire is in contact with the drum through a considerable arc of its circumference, as indicated in Fig. 6. The proportions are such preferably that this arc of contact is in the neighborhood of 120°. This arc of contact should, however, preferably be less than 180° so as to leave the upper side of the tire free from contact with the drum and permit maximum resiliency of action and minimum wear on the tire.

It will be seen that normally there is no vertical load on the axle 23 which connects the guiding or track wheels. In case of the deflation of a pneumatic tire, however, the corresponding end of the axle 11 descends and the fitting 14 comes to rest on the projection 27 carried by the axle 23 so that the vertical load is immediately taken up by the axle 23 and the guiding wheels on the opposite ends thereof. A resilient or soft rubber buffer 28 may be interposed on the abutment 27 to avoid metallic contact. Transverse or lateral thrust or movement of the guiding wheels with respect to the pneumatic tire wheels may be taken up by resilient means 29.

The guiding axle 23 is held in its proper position beneath the axle 11 by means of a frame 30 which extends downwardly from the lower end of the fitting 14. Resilient pads 31 may be interposed between the sides of the frame 30 and the axle 23 as shown in Fig. 4.

In the form shown in Figs. 3 and 4 the rubber abutment 32 arranged above the fitting or housing 14' acts as a resilient bumper. The frame is strengthened by diagonal ties 33.

I also preferably provide guides for holding the axles in appropriate parallel relation. This means consists of flanges 34 which are welded or otherwise secured on opposite sides of the bearing bodies 15 on axle 11 and which are adapted to slide up and down between guides 35 which are secured to the tubular ends of axle 23. The pads 31 prevent the underslung axle 23 from swinging excessively.

It should be understood that running gear of this type may be used on self-propelled or towed vehicles. If the vehicles are to be self-propelled power may be applied in a suitable manner through the load axle 11 or directly to the guiding wheels 21.

It will also be understood that any suitable type of braking system may be employed with wheels of this type. In the form shown a brake drum 40 is provided which forms a part of the guiding wheel. In this particular form the rim portion and the hub portion are separately formed and secured together by a number of bolts 41. To prevent these bolts from working loose I provide a guard plate 42 which is secured around the heads of the bolts in the space behind the pneumatic tire. This plate may be secured in position by bolts or screws 43.

From the foregoing it will be seen that the construction is such that pneumatic tires may be employed of any desirable supporting capacity and in fact a number of pneumatic tires may be employed within the drum of each guiding wheel. It should also be understood that the outer track engaging surface may be of any suitable character, shape or material.

It will be understood that the invention in its broadest aspect is not limited to any particular number of wheels and is not limited to any particular type of car or vehicle construction. While the invention contemplates the arrangement of wheels in pairs with almost concentric tires, it is of course expected that such wheels may be employed in four-wheeled trucks or at the opposite ends of the car body or on articulated cars.

It will be seen that I have to a maximum extent eliminated metallic connection between the guiding wheels and the vehicle body or load so as to avoid the destructive vibrations set up between a vehicle and the track. The complete damping of shocks also prevents the transmission and broadcasting of noises due to such vibrations and shocks.

Although pneumatic tires as ordinarily used on road vehicles frequently become excessively and dangerously hot when used, particularly in hot weather, it will be found that the present construction provides sufficient agitation of the air and radiation of the air about the pneumatic tire and the associated metallic parts to avoid the evil effects of overheating.

Figure 7:
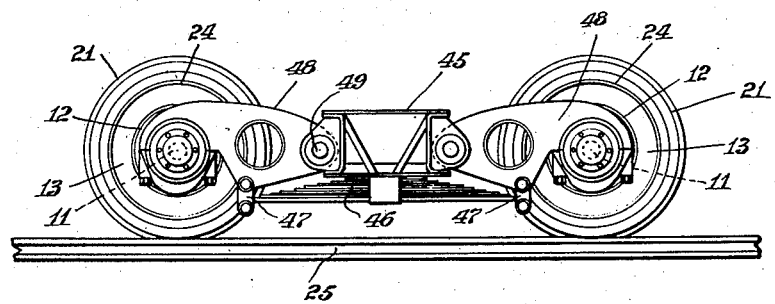
Fig. 7 is a side view showing a truck having a pair of wheels which may represent any form of car body or chassis.

It will be understood that the wheel systems may be associated with the car frame in various ways. In the form shown in Fig. 7 the truck body or bogie 45 supports a spring 46, the ends of which are connected by links 47 to the equalizer arms 48. Each arm is hinged at 49 to the truck body and is connected at its outer end with one of the inner axles 11. This permits considerable independence of action of the individual wheels and also ensures a maximum degree of stability.

By the present construction it will be seen that under normal conditions the load is carried by the pneumatic tires but that even in case a pneumatic tire becomes deflated it is still possible to safely continue the movement of the vehicle with the deflated tire until convenient to repair or reinflate the tire.

The present invention is most generally useful when the load tires or wheels have suitable pneumatic tubes under air pressures. Certain features of the invention, however, may have special uses with other resilient tires such as solid rubber, cushion, or air chambered tires.

I claim:

1. Running gear for vehicles comprising a relatively stationary axle normally free of the vertical load of the vehicle, a part at least of said axle being hollow, a track-engaging wheel rotatably supported upon a hollow part of said axle, a load bearing axle extending through the hollow part of said track wheel axle, a resiliently tired load wheel carried by the load bearing axle and travelling within the track-engaging wheel and movable independently thereof, and a fitting supported on said load bearing axle and connected with said track wheel axle and adapted at times to transmit the vehicle load to the track wheel axle.

2. Running gear as set forth in claim 1 having means for limiting the turning movement of said fitting.

3. Running gear comprising a track wheel capable of running on rails and having a relatively stationary axle normally free from any substantial vertical load from the vehicle, a resiliently tired wheel running within the track wheel and having an axle, a main supporting spring through which the load of the vehicle is normally applied to said resiliently tired wheel, and means associated with said spring and said axles for transmitting the load to the track wheel and axle under certain circumstances without relative backward and forward movement between said axles.

4. Running gear comprising a track wheel having an axle normally free from the main load of the vehicle, a resiliently tired wheel running in the track wheel and having a supporting axle, a fitting having a bearing on said supporting axle, and means of connection between said fitting and the track wheel axle for transferring the main load of the vehicle from the resiliently tired wheel to the track wheel axle under certain circumstances.

5. Running gear as set forth in claim 4 having means for limiting the movement of the fitting with respect to said axle.

6. Running gear comprising a track wheel having an axle normally free from the main load of the vehicle, a resiliently tired wheel running within the track wheel and having a supporting axle normally maintaining the load of the vehicle, and a fitting having a bearing on the axle of the resiliently tired wheel and connected to the other axle to limit the relative movement of the axles vertically.

7. Running gear comprising a track wheel having an axle with a bearing for the wheel, a pneumatically tired wheel running within said track wheel, an axle for the pneumatically tired wheel, a fitting having a bearing on the axle of the pneumatically tired wheel, means for limiting the rotation of said fitting, and means of connection between said fitting and the axle of the track wheel to prevent rotation of the fitting.

8. Running gear comprising a track wheel having an axle, a resiliently tired load wheel running within the track wheel and having an axle, a vehicle frame, a fitting having a bearing on the axle of the load wheel, a spring interposed between the said frame and said fitting, a tie rod connecting said frame and said fitting, and means of connection between said fitting and the axle of the track wheel for maintaining the latter axle in its proper position and transferring the vehicle load to said axle under certain circumstances.

9. Running gear comprising a track wheel having an axle normally free from the load of the vehicle, a pneumatically tired load wheel running within the track wheel and having an axle normally supporting the load of the vehicle, a fitting having a bearing supported on the axle of the load wheel, and means of connection between said fitting and the axle of the track wheel including resilient buffers for limiting the turning movement of the axle of the track wheel with respect to the axis of the load wheel.

10. Running gear comprising a vehicle frame, a track wheel having an axle normally free from the load of the vehicle, a resiliently tired wheel running within the track wheel and having an axle normally carrying the load of the vehicle, a fitting supported on the latter axle and having means embracing a part of the other axle, a resilient buffer interposed between said fitting and the vehicle frame and resilient means interposed between said fitting and the axle of the track wheel.

11. Running gear comprising a track wheel, a tubular support therefor, a resiliently tired wheel running in the track wheel and having an axle extending through the tubular support, means for normally applying the vertical load to said axle, a fitting having a bearing on said axle, means of connection between said fitting and said support for preventing the support from rotating and transmitting the load to said support under certain circumstances.

12. Running gear comprising a track wheel, a tubular support therefor, a pneumatically tired wheel running in the track wheel and having an axle extending through said support, a fitting having a bearing supported by said axle, said fitting having means of connection with said support to prevent the support from rotating, and means for applying the load from said axle to said support.

13. Running gear comprising two oppositely disposed track wheels, a tubular support for each track wheel, and axle connecting said supports, resiliently tired wheels running in the track wheels, an axle for the resiliently tired wheels extending through the tubular supports, means for normally applying the vehicle load to the axle of the resiliently tired wheels, and fittings having bearings on the axle of the resiliently tired wheels and having means of connection with the other axle to keep the axles in the same vertical plane.

14. A vehicle wheel construction comprising a track wheel having a support normally free of the main vehicle load and having a drum member, a pneumatically tired load carrying wheel running within the drum member of the track wheel and of slightly less external diameter than the internal diameter of said drum member, the load carrying surface being wider than the tread of the track wheel and of a circumferential arc more than ninety degrees and less than one hundred and eighty degrees.

15. Running gear comprising a pair of track wheels having tubular supports and an underslung connecting axle, pneumatic tire wheels running within the track wheels and having an axle extending through the tubular supports, means for limiting the swinging action of the underslung axle with respect to the other axle and means for guiding the second mentioned axle vertically with respect to the tubular supports.

16. Running gear comprising an outer wheel having a hollow hub, a pneumatic tire within the outer wheel, radially outside of said hub, and axially outside of the outer wheel, a load wheel and axle for the tire, the axle extending through the hollow hub, and a device for transmitting the load to said outer wheel when the tire is deflated without transmitting the load through said tire, and for limiting the vertical movement of the load axle within the hub as well as substantially eliminating any backward and forward movement of the load axle within the hub.

17. Running gear comprising an outer wheel having a hollow hub, a pneumatic tire within the outer wheel, radially outside of said hub, and axially outside of the outer wheel, a load wheel and axle for the tire, the axle extending through the hollow hub, a device for transmitting load to the outer wheel when the tire is deflated without transmitting the load through said tire and for limiting the vertical movement of the load axle within the hub as well as limiting any backward and forward movement of the load axle within the hub, and thrust surfaces in addition to said device for transmitting axial thrusts between the outer wheel and the load wheel.

18. Running gear comprising an outer wheel having a hollow stationary hub, a pneumatic tire within the outer wheel, radially outside of said hub and axially outside of the outer wheel, a load wheel and axle for the tire, the axle extending through the hollow hub, and a device for cooperation with the load axle and hub to limit vertical movement of the axle within the hub when the tire is deflated without transmitting the load through said tire.

19. Running gear comprising an outer wheel having a hollow hub, a pneumatic tire within the outer wheel, radially outside of said hub and axially outside of the outer wheel, a load wheel and axle for the tire, the axle extending through the hollow hub, and a device for cooperation with said load axle and said hub to limit the vertical and substantially eliminate horizontal movements of the load axle within said hub when the tire is deflated.

20. Running gear for rail vehicles, comprising in combination drum-shaped guiding wheels having a profile like that of a rail wheel, supporting wheels with resilient tires within the said guiding wheels and capable of running therein, means to limit the relative displacement of said guiding wheels and said supporting wheels, a vehicle frame resting on the supporting wheels, a rigid axle for the guiding wheels and anti-friction bearings between the guiding wheels and the rigid axle, and means to prevent any metallic connection between said frame and axle under any conditions.

21. Running gear for rail vehicles, comprising in combination a vehicle frame, drum-shaped guiding wheels having a profile like that of a rail wheel, a rigid axle for the guiding wheels, supporting wheels with resilient tires within the guiding wheels and capable of running therein and disposed at the outside with respect to the vehicle, means to limit the relative displacement of said guiding wheels and said supporting wheels and means forming an abutment for them disposed towards the inside and adapted to prevent any metallic connection between said frame, and axle under any conditions.

22. Running gear for rail vehicles, comprising in combination drum-shaped guiding wheels having a profile like that of a rail wheel and supporting wheels with resilient tires within the said guiding wheels and capable of running therein, means to limit the relative displacement of said guiding wheels and said supporting wheels, a vehicle frame, an axle for the supporting wheels, a rigid axle for the guiding wheels capable of acting as an abutment for the axle of the supporting wheels, and adapted to prevent any metallic connection between said frame and axle under any conditions.

OSKAR HACKER.